April 18, 1944.　　　M. S. ARIENS　　　2,347,017
ROTARY SOIL TILLER
Filed Oct. 6, 1941　　　2 Sheets-Sheet 2

INVENTOR
MANDO S. ARIENS
BY
ATTORNEYS

Patented Apr. 18, 1944

2,347,017

UNITED STATES PATENT OFFICE 2,347,017

ROTARY SOIL TILLER

Mando S. Ariens, Brillion, Wis.

Application October 6, 1941, Serial No. 413,814

5 Claims. (Cl. 97—3)

This invention appertains to rotary tillers or soil pulverizers of the type disclosed in my Patent No. 2,025,494, issued December 24, 1935.

In operating wheeled rotary tillers over uneven ground, much difficulty is experienced as the tiller sways or rocks from side to side as the wheels ride over the broken ground. Consequently, uneven tilling results. Likewise, the wheels leave objectionable marks or gutters in the soil.

Due to the rotary action of the ground-working members, the soil is aerated or fluffed up as the tiller is drawn over the ground, and, consequently, the prepared bed is not in the best condition for receiving the seed. This is due to the fact that after seeding, the fluffed soil settles, and the seeds sink different distances in the bed. Consequently, a uniform crop is not obtained.

It is, therefore, one of the primary objects of my invention to provide a large rolling support for the tiller, which extends entirely across the machine, and which eliminates the use of wheels, whereby the machine can effectively travel over the ground without swaying, so that the soil is left in a uniform tilled condition throughout.

Another salient object of my invention is to provide an elongated rolling support for the tiller, which will effectively pack and level the soil, and thereby leave the bed in the best possible condition for receiving the seed.

A further important object of my invention is to provide novel means for mounting the supporting, smoothing and packing roller on the frame of the machine, whereby the frame of the machine with the rotary earth-working elements can be raised or lowered into and out of the ground substantially in a straight path.

A still further object of my invention is to provide a single machine for effectively working, leveling and packing the soil in one operation, which will be of an exceptionally simple and durable character.

With these and other objects in view, the invention consists in the novel construction, arrangement, and formation of parts, as will be hereinafter more specifically described, claimed, and illustrated in the accompanying drawings, in which drawings:

Figure 3 is a detail, transverse, sectional view taken on the line 3—3 of Figure 2, looking in the direction of the arrows, illustrating one form of means for manually raising and lowering the frame of the machine.

Figure 4 is a fragmentary, detail, sectional view taken on the line 4—4 of Figure 1, looking in the direction of the arrows, illustrating the means for suspending the rear end of the frame of the tiller from the supporting frame for the smoothing and packing roller.

Figure 1:
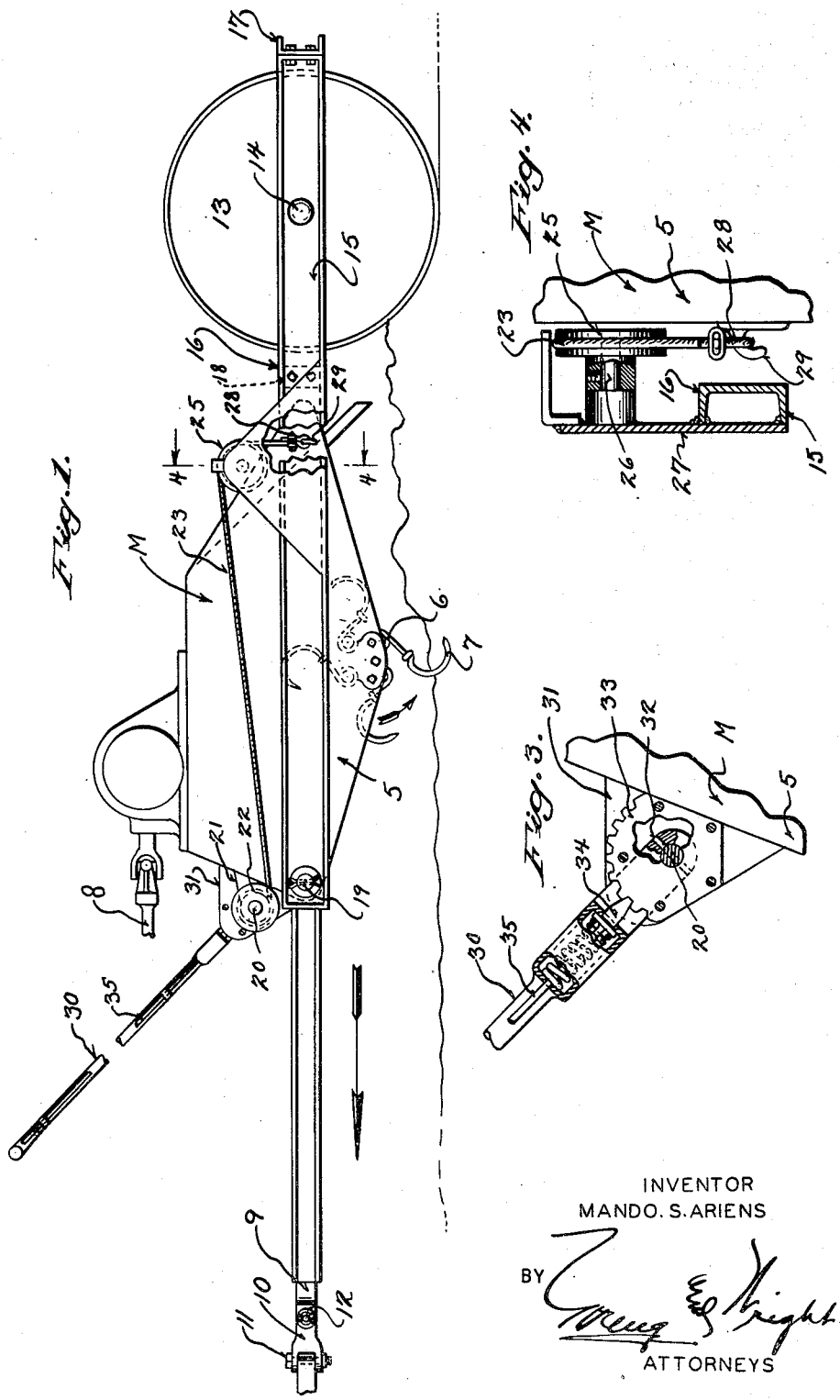
Figure 1 is a side elevational view of my improved machine.

Referring to the drawings in detail, wherein similar reference characters designate corresponding parts throughout the several views, the letter M generally indicates my improved machine, and the same includes the main body portion 5, which can be of the same character and type as shown in my mentioned patent, and, hence, the same includes a rotary earth-working member 6, which extends transversely across the machine. As illustrated, the rotary earth-working member 6 includes a plurality of resilient tines 7. The member 6 is rotated through the medium of a drive shaft 8 from the power take-off of a pulling tractor (not shown).

Extending forwardly from the body 5 is the drawbar 9, which carries a suitable coupling 10 for connection with the tractor. The coupling 10 includes a vertical pivot 11 and a horizontal pivot 12 to permit the desired movement of my machine relative to the tractor incident to the drawing of the machine over the ground and the turning of corners and the like. This coupling 10 is of such a character as to eliminate all lost play, so that a substantially rigid coupling will be had.

As stated in the objects of the specification, the side ground wheels shown in my prior patent are eliminated, and I substitute therefor the elongated smoothing and packing roller 13, which extends entirely across the machine in back of the body portion 5 thereof. This roller 13 is mounted on a shaft or axle 14 carried by the spaced parallel longitudinally extending side beams 15 of the frame 16 for said roller. The rear ends of the beams 15 are rigidly connected by means of a cross end beam 17. The frame can also be braced by additional cross beams 18, if so desired.

To facilitate turning of the machine, the smoothing roller 13 can be made in separate sections, if so desired.

Figure 2:
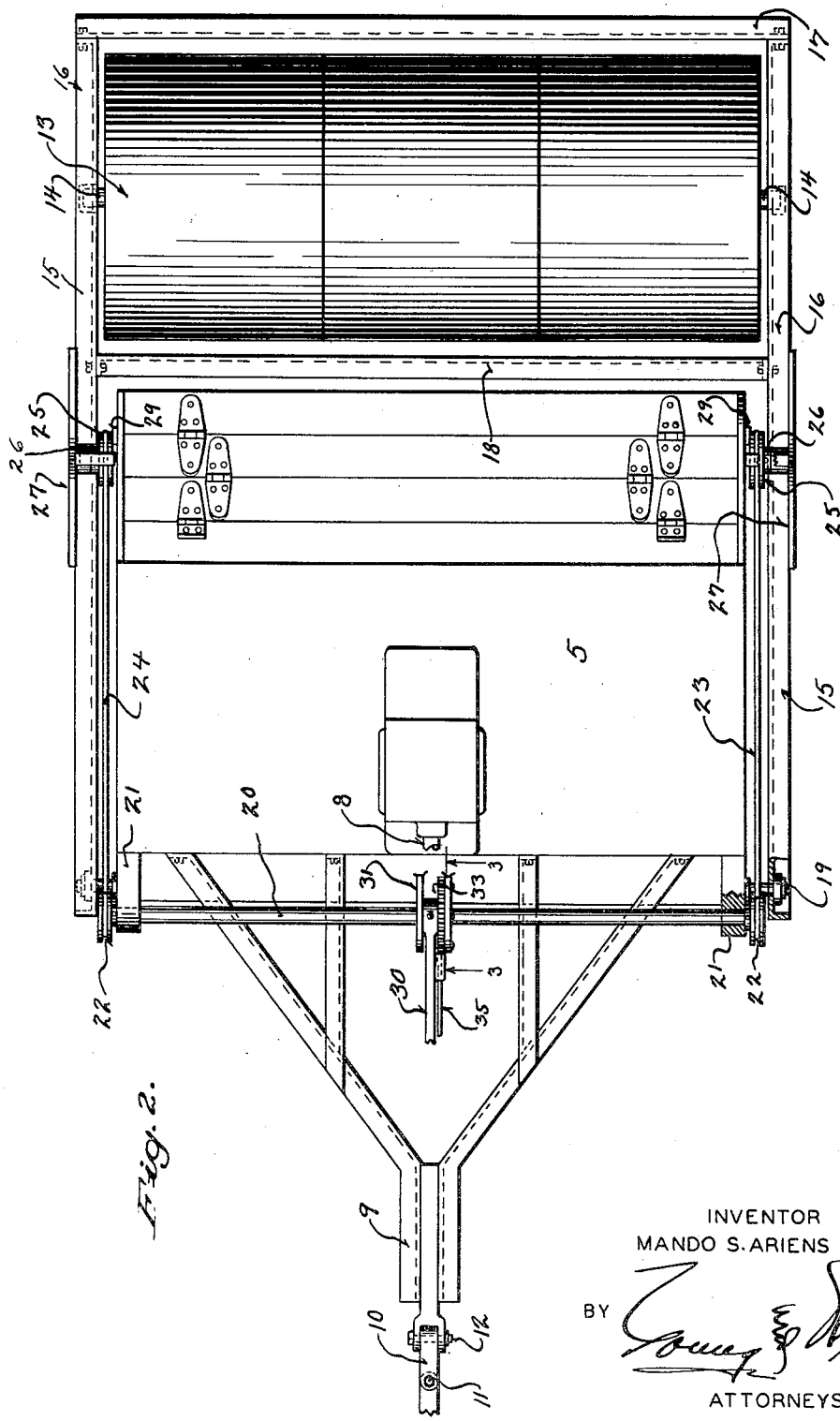
Figure 2 is a top plan view of my improved machine, showing parts thereof broken away and in section to illustrate structural details.

The side supporting frame beams 15 extend on opposite sides of the body 5 of the machine to the front end thereof, and these beams are rockably mounted on suitable stub shafts 19 rigidly fastened to the front end of the frame of the body 5 of the machine, as is clearly shown in Figure 2 of the drawings.

Arranged in front of the machine is an operating shaft 20, and this shaft is rotatably mounted in suitable bearings 21 carried by the front end of the frame of the body 5. The ends of the shaft 20 have secured thereto drums 22, and cables 23 and 24 are wound about these drums and are fastened thereto. The cables 23 and 24 extend longitudinally of the machine and are trained over idle pulley wheels 25. These idle pulley wheels 25 are supported by stub shafts 26, which are, in turn, fastened to triangular-shaped frame plates 27, which are firmly welded or otherwise secured to the longitudinally extending side beams 15 of the supporting frame 16. The outer lower ends of the cables 23 and 24 carry eyes 28, which are placed over hooks 29 securely fastened to the opposite sides of the frame of the body of the machine adjacent the rear end thereof (see Figures 1 and 4).

By turning the shaft 20, the body of the machine can be raised or lowered, and as the cables are connected to the rear end of the body of the machine, this end moves substantially in a straight vertical path.

The shaft 20 can be manipulated in any desired way, and, as illustrated, I provide a hand lever 30, which is rockably mounted on the shaft intermediate its ends between bracket plates 31, which are carried by the body of the machine. The lever 30 can be rigidly fastened to the shaft in any desired way, such as by the use of a key or pin 32. One of the bracket plates 31 has rigidly fastened thereto a sector rack plate 33. A spring-pressed pawl or dog 34 is carried by the lever 30 for engaging selected teeth of the sector rack, and the dog can be pulled out of engagement with the rack by means of a rod 35, which is connected with said dog. The outer end of the rod can be provided with a single grip for facilitating the movement of the dog.

Hence, by manipulating the lever, the body of the tiller can be raised and lowered on the supporting frame of the smoothing and packing roller, so as to bring the rotary earth-working member into or out of the ground.

As the roller 13 forms a direct part of the machine, the roller functions as a wide rolling support for the machine and prevents swaying thereof. Also, the roller smooths and levels the soil after the tilling proper has done its soil preparing work. This latter feature is additionally important because the action of the tilling tines is such as to make the soil very loose and fluffy. The roller presses and packs this loose soil sufficiently tight so that seeding with fine seeds is more readily accomplished, and prevents drifting of the seeds into uneven depths as the loose soil settles. Ordinarily, if fine seeds are planted in this loose soil, the uneven settling causes uneven growth, depending upon how the seeds have settled into the loose soil.

With my improved machine, the necessity of employing plankers, smoothing harrows, etc., in preparing vegetable seed beds is entirely eliminated. Hence, my machine completely prepares the soil ready for planting in one operation.

Changes in details may be made which do not depart from the spirit and scope of my claims, and what I claim as new is:

1. A machine for working, leveling, and packing soil comprising, a body, a rotary tiller supported by said body, a transversely extending roller for supporting said body arranged in rear of the body and rotary tiller carried thereby, a non-wheel supported frame for receiving said roller including side beams, means rockably connecting the forward ends of the beams to the front end of the body, means connecting the ends of the roller to said side beams, and means for suspending the rear end of the body from the side beams.

2. A machine for working, leveling, and packing soil comprising, a body, a rotary tiller supported by said body, a transversely extending roller for supporting said body arranged in rear of the body and rotary tiller carried thereby, a non-wheel supported frame for receiving said roller including side beams, means rockably connecting the forward ends of the beams to the front end of the body, means connecting the ends of the roller to said side beams, means for suspending the rear end of the body from the side beams, and means for raising and lowering said suspending means.

3. A machine for working, leveling, and packing soil in one operation comprising, a body, a rotary tiller extending transversely across the body and carried thereby, a non-wheel supported frame including side beams extending rearwardly of the body, a roller for supporting said body extending entirely across the machine connected with said side beams, means rockably connecting the forward ends of the beams to the front end of the body, adjustable means connecting the rear end of the body to the beams intermediate the ends thereof, said roller supporting said body and leveling and packing the soil in rear of the rotary tiller after the soil has been acted upon by said rotary tiller.

4. A machine for working, leveling, and packing soil in one operation comprising, a body, a rotary tiller extending transversely across the machine carried by said body, a non-wheel supported frame including side beams arranged on opposite sides of the body, means rockably connecting the forward ends of the beams to the front end of the body, a roller for supporting said body carried by the beams in rear of the body and the rotary tiller, a rotary shaft carried by the front end of the body, drums fixed to said shaft, cables wound upon said drums extending toward the rear of the body and connected to the sides of the body adjacent the rear ends thereof, idle pulleys carried by the beams over which the cables are trained, and a hand lever for operating said shaft.

5. A machine for working, leveling, and packing soil comprising, a body, a rotary tiller supported by said body, a transversely extending roller arranged in rear of the body and the rotary tiller carried thereby, a non-wheel supported frame for receiving said roller including side beams, means rockably connecting the forward ends of the beams to the front end of the body, means connecting the ends of the roller to said side beams, means for suspending the rear end of the body from the side beams, and a universal coupling having no longitudinal play connecting the forward end of said frame to a pulling vehicle for supporting the extreme forward end of said body, whereby the frame can swing in a vertical and horizontal plane from the pulling vehicle without any play longitudinally of the coupling.

MANDO S. ARIENS.